United States Patent
Saimen

(10) Patent No.: US 12,278,360 B2
(45) Date of Patent: Apr. 15, 2025

(54) POSITIVE ELECTRODE AND ELECTRICITY STORAGE DEVICE

(71) Applicant: HONDA MOTOR CO., LTD., Tokyo (JP)

(72) Inventor: Kazuki Saimen, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 456 days.

(21) Appl. No.: 17/578,460

(22) Filed: Jan. 19, 2022

(65) Prior Publication Data
US 2022/0255058 A1 Aug. 11, 2022

(30) Foreign Application Priority Data
Feb. 10, 2021 (JP) ................................ 2021-019737

(51) Int. Cl.
| | |
|---|---|
| *H01M 4/131* | (2010.01) |
| *H01M 4/36* | (2006.01) |
| *H01M 4/485* | (2010.01) |
| *H01M 4/58* | (2010.01) |
| *H01M 4/02* | (2006.01) |

(52) U.S. Cl.
CPC ........... *H01M 4/364* (2013.01); *H01M 4/131* (2013.01); *H01M 4/485* (2013.01); *H01M 4/5825* (2013.01); *H01M 2004/021* (2013.01); *H01M 2004/028* (2013.01)

(58) Field of Classification Search
CPC .................................................. H01M 4/131
See application file for complete search history.

(56) References Cited

U.S. PATENT DOCUMENTS

| | | | |
|---|---|---|---|
| 2013/0260250 A1 | 10/2013 | Yada et al. | |
| 2015/0372298 A1 | 12/2015 | Fujieda et al. | |
| 2018/0254477 A1* | 9/2018 | Horikawa | H01M 10/0525 |
| 2019/0296390 A1* | 9/2019 | Yoshima | H01M 4/621 |
| 2021/0210758 A1* | 7/2021 | Saimen | H01M 4/62 |
| 2022/0328934 A1 | 10/2022 | Saimen et al. | |

FOREIGN PATENT DOCUMENTS

| | | | | |
|---|---|---|---|---|
| CN | 103262316 A | | 8/2013 | |
| CN | 110299556 A | | 10/2019 | |
| CN | 111129462 A | * | 5/2020 | ........ H01M 10/0525 |
| JP | 2016119180 A | | 6/2016 | |
| JP | 2019169252 A | | 10/2019 | |
| WO | 2014132320 A1 | | 9/2014 | |
| WO | WO-2019225387 A1 | * | 11/2019 | ........ H01M 10/0525 |
| WO | 2020245911 A1 | | 12/2020 | |

OTHER PUBLICATIONS

Machine translation of CN 111129462 A (Year: 2020).*
Office Action issued Oct. 30, 2024 in the CN Patent Application No. 202111483097.2.
Notification of Reasons for Refusal issued Nov. 12, 2024 in the JP Patent Application No. 2021-019737.

* cited by examiner

*Primary Examiner* — Maria Laios
*Assistant Examiner* — Zackary Richard Cochenour
(74) *Attorney, Agent, or Firm* — CKC & Partners Co., LLC

(57) ABSTRACT

Provided is a positive electrode including: a positive electrode current collector; and a positive electrode material mixture layer including a positive electrode active material and dielectric particles, the dielectric particles including ionically-conductive particles and non-ionically-conductive particles. Also provided is an electricity storage device including: the positive electrode; a negative electrode; and an electrolytic solution.

4 Claims, No Drawings

POSITIVE ELECTRODE AND ELECTRICITY STORAGE DEVICE

This application is based on and claims the benefit of priority from Japanese Patent Application 2021-019737, filed on 10 Feb. 2021, the content of which is incorporated herein by reference.

BACKGROUND OF THE INVENTION

Field of the Invention

The present invention relates to a positive electrode and an electricity storage device.

Related Art

In the conventional art, lithium-ion secondary batteries are in widespread use as high-energy-density, electricity-storage devices. A typical lithium-ion secondary battery includes a positive electrode, a negative electrode, a separator provided between the electrodes, and an electrolytic solution with which the separator is impregnated. The positive electrode includes, for example, a positive electrode current collector and a positive electrode material mixture layer on the current collector.

Patent Document 1 discloses a positive electrode containing dispersed barium titanate particles having a relative permittivity of 500 or more and a particle size of 200 nm or less.

Patent Document 1: Japanese Unexamined Patent Application, Publication No. 2016-119180

SUMMARY OF THE INVENTION

Unfortunately, when used alone, barium titanate particles having a particle size of 200 nm or less, which have a large specific surface area, tend to aggregate. The aggregation results in a reduction in the area of contact between the particles and the electrolytic solution so that even when the electric field generated inside the lithium-ion secondary battery acts on the barium titanate particles, the dielectric polarization of the barium titanate particles will be insufficiently effective in increasing the dissociation degree of the supporting salt in the electrolytic solution, which will cause the problem of an increase in initial cell resistance.

In the positive electrode of the lithium-ion secondary battery, the positive electrode active material and the electrolytic solution may undergo corrosion and decomposition respectively, which may also cause the problem of an increase in cell resistance after an endurance test on the lithium-ion secondary battery.

It is an object of the present invention to provide a positive electrode with which an electricity storage device can be produced having a lower initial cell resistance and having a lower cell resistance after an endurance test.

An aspect of the present invention relates to a positive electrode including a positive electrode current collector; and a positive electrode material mixture layer, the positive electrode material mixture layer including a positive electrode active material and dielectric particles, the dielectric particles including ionically-conductive particles and non-ionically-conductive particles.

The positive electrode material mixture layer may contain 0.5% by mass or more and 5% by mass or less of the dielectric particles.

The ionically-conductive particles may be oxide particles, and the non-ionically-conductive particles may be oxide particles.

The ionically-conductive particles may have a relative permittivity of 30 or more, and the non-ionically-conductive particles may have a relative permittivity of 30 or more.

The ionically-conductive particles may have a lithium-ionic conductivity of $1 \times 10^{-7}$ S/cm or more at 25° C.

The non-ionically-conductive particles may have a median diameter of 0.07 μm or more and 0.5 μm or less.

The ionically-conductive particles may have a median diameter of 0.4 μm or more and 1.0 μm or less.

The dielectric particles may contain 2% by mass or more and 50% by mass or less of the non-ionically-conductive particles.

The dielectric particles may contain 50% by mass or more and 98% by mass or less of the ionically-conductive particles.

Another aspect of the present invention relates to an electricity storage device including: the positive electrode defined above; a negative electrode; and an electrolytic solution.

The present invention makes it possible to provide a positive electrode with which an electricity storage device can be produced having a lower initial cell resistance and having a lower cell resistance after an endurance test.

DETAILED DESCRIPTION OF THE INVENTION

Hereinafter, embodiments of the present invention will be described.

Positive Electrode

A positive electrode according to an embodiment of the present invention includes a positive electrode current collector and a positive electrode material mixture layer. The positive electrode material mixture layer includes a positive electrode active material and dielectric particles, and the dielectric particles include ionically-conductive particles and non-ionically-conductive particles.

In an embodiment of the present invention, the positive electrode may have the positive electrode material mixture layer on one side of the positive electrode current collector or on each side of the positive electrode current collector.

In the positive electrode according to the embodiment, the dielectric particles in the positive electrode material mixture layer include not only ionically-conductive particles but also non-ionically-conductive particles, which are less likely to aggregate and more likely to disperse in the positive electrode material mixture layer. Thus, when the electric field generated inside an electricity storage device acts on the non-ionically-conductive particles, the dielectric polarization of the non-ionically-conductive particles increases the dissociation degree of the supporting salt in the electrolytic solution to reduce the initial cell resistance of the electricity storage device.

The non-ionically-conductive particles in the positive electrode material mixture layer are also effective in trapping a small amount of an acid in an electrolytic solution or effective in interacting with and stabilizing the electrolytic solution to prevent the corrosion of the positive electrode active material and the decomposition of the electrolytic solution, which allows an electricity storage device to have a low cell resistance after an endurance test.

The ionically-conductive particles and the non-ionically-conductive particles preferably have high relative permittivity in order to provide an electricity storage device having low cell resistance initially and after an endurance test.

This is because according to the principle of polarization of the non-ionically-conductive particles, the displacement of positive and negative charges (for example, the displacement of positive and negative charges on atoms in $BaTiO_3$) can be shifted by application of an external electric field. The dielectric polarization of the non-ionically-conductive particles is less affected by pulverization as long as the crystal structure is maintained during pulverization. Thus, as the non-ionically-conductive particles undergo pulverization, their surface area increases, and accordingly their relative permittivity increases. Therefore, the non-ionically-conductive particles are preferably in the form of fine particles with a median diameter of 0.5 µm or less, which can have a large area of contact with an electrolytic solution.

When used alone, the non-ionically-conductive particles in the form of fine particles will aggregate together to decrease in the area of contact with an electrolytic solution. This results in an increase in the initial cell resistance of an electricity storage device.

According to the principle of polarization of the ionically-conductive particles, ions will be diffused and biased inside the ionically-conductive particles by application of an external electric field. Thus, as the median diameter of the ionically-conductive particles decreases, the ion diffusion range becomes limited, and accordingly the ionically-conductive particles decrease in relative permittivity.

The interior of the positive electrode (positive electrode material mixture layer) has pores with diameters mainly distributed in the range of 0.02 to 2 µm. Therefore, the ionically-conductive particles and the non-ionically-conductive particles to be used preferably have a median diameter in that range.

In the positive electrode according to the embodiment, the content of the dielectric particles in the positive electrode material mixture layer is preferably 0.5% by mass or more and 5% by mass or less, and more preferably 1.0% by mass or more and 2.0% by mass or less. When the content of the dielectric particles in the positive electrode material mixture layer is 0.5% by mass or more, an electricity storage device produced with the positive electrode can have low cell resistance initially and after an endurance test. When the content of the dielectric particles in the positive electrode material mixture layer is 5% by mass or less, an electricity storage device produced with the positive electrode can have high energy density.

Ionically-Conductive Particles

The ionically-conductive particles may be oxide particles.

Examples of the oxide constituting the oxide particles include $Li_{1.3}Al_{0.3}Ti_{1.7}P_3O_{12}$, $Li_{0.33}La_{0.55}TiPO_3$, $LiNbO_3$, and $Li_3PO_4$.

The ionically-conductive particles preferably have a relative permittivity of 30 or more, more preferably 40 or more. When produced with the ionically-conductive particles with a relative permittivity of 30 or more, an electricity storage device can have low initial cell resistance.

The ionically-conductive particles preferably have a lithium-ionic conductivity of $1\times10^{-7}$ S/cm or more, more preferably $1\times10^{-4}$ S/cm or more at 25° C. When produced with the ionically-conductive particles with a lithium-ionic conductivity of $1\times10^{-7}$ S/cm or more at 25° C., an electricity storage device can have low initial cell resistance.

The ionically-conductive particles preferably have a median diameter of 0.4 µm or more and 1.0 µm or less, more preferably 0.5 µm or more and 0.8 µm or less. When produced with the ionically-conductive particles with a median diameter of 0.4 µm or more and 1.0 µm or less, an electricity storage device can have low initial cell resistance.

The content of the ionically-conductive particles in the dielectric particles is preferably 50% by mass or more and 98% by mass or less, and more preferably 60% by mass or more and 70% by mass or less. When produced with the dielectric particles containing 50% by mass or more of the ionically-conductive particles, an electricity storage device can have low initial cell resistance. When produced with the dielectric particles containing 98% by mass or less of the ionically-conductive particles, an electricity storage device can have low cell resistance after an endurance test.

Non-Ionically-Conductive Particles

The non-ionically-conductive particles may be oxide particles.

The oxide constituting the oxide particles may be, for example, $BaTi_{1-x}Zr_xO_3$ ($0 \leq X \leq 0.5$), $SrBi_2Ta_2O_9$, $(K_{1-x}Na_x)NbO_3$ ($0 \leq X \leq 1$), $BiFeO_3$, or $CaCu_3Ti_4O_{12}$.

The non-ionically-conductive particles preferably have a relative permittivity of 30 or more, more preferably 40 or more. When produced with the non-ionically-conductive particles with a relative permittivity of 30 or more, an electricity storage device can have low cell resistance after an endurance test.

The non-ionically-conductive particles preferably have a median diameter of 0.07 µm or more and 0.5 µm or less, more preferably 0.1 µm or more and 0.5 µm or less. When produced with the non-ionically-conductive particles with a median diameter of 0.07 µm or more and 0.5 µm or less, an electricity storage device can have low cell resistance after an endurance test.

The content of the non-ionically-conductive particles in the dielectric particles is preferably 2% by mass or more and 50% by mass or less, and more preferably 30% by mass or more and 40% by mass or less. When produced with the dielectric particles containing 2% by mass or more of the non-ionically-conductive particles, an electricity storage device can have low cell resistance after an endurance test. When produced with the dielectric particles containing 50% by mass or less of the non-ionically-conductive particles, an electricity storage device can have low initial cell resistance.

Positive Electrode Material Mixture Layer

The positive electrode material mixture layer includes a positive electrode active material and the dielectric particles, and an optional component.

Examples of the optional component include a solid electrolyte, a conductive aid, and a binder.

The positive electrode active material may be any appropriate material capable of storing and releasing lithium ions. Examples of the positive electrode active material include, but are not limited to, $LiCoO_2$, $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.05})O_2$, $Li(Ni_{1/6}Co_{4/6}Mn_{1/6})O_2$, $Li(Ni_{1/3}CO_{1/3}Mn_{1/3})O_2$, $LiCoO_4$, $LiMn_2O_4$, $LiNiO_2$, $LiFePO_4$, lithium sulfide, and sulfur.

Positive Electrode Current Collector

The positive electrode current collector is typically, but not limited to, a metal foil or the like.

The metal foil may be made of aluminum or any other appropriate metal.

Method for Producing Positive Electrode

The positive electrode according to the embodiment may be produced using any method conventional in the field of the art, which may include, for example, applying, onto a positive electrode current collector, a paste that is for forming a positive electrode material mixture layer and includes the positive electrode active material and the dielectric particles; and then drying the paste.

The formation of the positive electrode material mixture layer on the positive electrode current collector may be followed by a method conventional in the field of the art. For example, the positive electrode current collector provided with the positive electrode material mixture layer is subjected to pressing to give a positive electrode. The pressing can adjust the density of the positive electrode.

Electricity Storage Device

An electricity storage device according to an embodiment of the present invention includes the positive electrode according to the embodiment, a negative electrode, and an electrolytic solution.

The electricity storage device is, for example, a secondary battery, such as a lithium-ion secondary battery, or a capacitor.

The negative electrode may be any known negative electrode available for electricity storage devices.

The electrolytic solution may be any known electrolytic solution available for electricity storage devices.

Lithium-Ion Secondary Battery

A lithium-ion secondary battery according to an embodiment of the present invention includes the positive electrode according to the embodiment, a negative electrode, an electrolytic solution, and a separator between the positive and negative electrodes.

The lithium-ion secondary battery according to the embodiment may be any type and may include two materials selected from materials available to form electrodes, one of which has a noble potential for the positive electrode and the other of which has a potential less noble for the negative electrode.

The separator may be any known separator available for lithium-ion secondary batteries.

EXAMPLES

Hereinafter, examples of the present invention will be described, which are not intended to limit the present invention.

Dielectric Particles

Dielectric particles were purchased from Toshima Manufacturing Co., Ltd. When necessary, the dielectric particles were pulverized with isopropyl alcohol (IPA) using a ball mill to give dielectric particles with an adjusted median diameter.

Table 1 shows the properties of ionically-conductive particles.

TABLE 1

| | Abbreviation | Relative permittivity/— | Li-ionic conductivity/ S/cm | $D_{50}$/ μm |
|---|---|---|---|---|
| $Li_{1.3}Al_{0.3}Ti_{1.7}P_3O_{12}$ | LATP | 50.1 | $1.0 \times 10^{-3}$ | 1.2 |
| | | 30.6 | | 0.5 |
| | | 28.0 | | 0.15 |
| $Li_{0.33}La_{0.55}TiO_3$ | LLT | 37.8 | $1.0 \times 10^{-4}$ | 1 |
| $LiNbO_3$ | LNO | 37.7 | $5.0 \times 10^{-6}$ | 0.5 |
| | | 61.7 | | 1 |
| $LiPO_4$ | LPO | 30.0 | $1.0 \times 10^{-7}$ | 1 |

Table 2 shows the properties of non-ionically-conductive particles.

TABLE 2

| | Abbreviation | Relative permittivity/— | Li-ionic conductivity/ S/cm | $D_{50}$/ μm |
|---|---|---|---|---|
| $BaTiO_3$ | BTO | 34.9 | — | 0.5 |
| | | 107.8 | | 0.07 |
| $BaZr_{0.2}Ti_{0.8}O_3$ | BZTO | 89.3 | — | 0.15 |

Method for Measuring Relative Permittivity of Powder

The powder was placed in a 38 mm diameter (R) tablet molding machine for measurement, and then compressed to a thickness (d) of 1 to 2 mm using a hydraulic press machine to give a compressed powder. The compressed powder was formed under such conditions as to achieve a powder relative density of 40% or more, which was calculated according to the formula: powder relative density $(D_{powder})$=(the weight density of the compressed powder/the true specific gravity of the powder)×100. The compressed powder was then measured for capacitance $C_{total}$ at 25° C. and 1 kHz by automatic balancing bridge method using an LCR meter, and the relative permittivity $\varepsilon_{total}$ of the compressed powder was calculated from the measurement. The relative permittivity $\varepsilon_{powder}$ of the powder (solid volume part) was then calculated from the resulting relative permittivity of the compressed powder using Formulas (1) to (3) below, in which $\varepsilon_0$ is the permittivity of vacuum (=8.854× $10^{-12}$) and $\varepsilon_{air}$ is the relative permittivity of air (=1).

The contact area A between the compressed powder and the $$\text{electrode}=(R/2)^2 \times \pi \quad (1)$$

$$C_{total}=\varepsilon_{total} \times \varepsilon_0 \times (A/d) \quad (2)$$

$$\varepsilon_{total}=\varepsilon_{powder} \times D_{powder}+\varepsilon_{air} \times (1-D_{powder}) \quad (3)$$

Method for Determining Li-Ionic Conductivity

An electrode was formed by Au sputtering on each side of the compressed powder. AC two-terminal method was carried out to determine Li-ionic conductivity, in which a voltage of 50 mv was applied across the resulting electrodes at a temperature of 25° C. and a frequency of 1 to $10^6$ Hz. The Li-ionic conductivity k was calculated from the resulting resistance value Ri through calculating the real number at which the imaginary component of the impedance was zero. The measuring instrument used was Solatron 1260/1287. The Li-ionic conductivity k is expressed by Formula (4) below, in which A' is the area of Au, and 1 is the thickness of the compressed powder.

$$k=l/(Ri \times A') \text{ (S/cm)} \quad (4)$$

Method for Measuring Median Diameter ($D_{50}$) of Powder

The particle size distribution of the powder was measured using a particle size distribution analyzer MT3000II (manufactured by Microtrac). In the measurement, water was used as a solvent, the refractive index was set to 1.81, and the median diameter was defined as the particle size at which the cumulative percentage (%) reached 50.

Examples 1 to 8 and Comparative Examples 1 to 3

Preparation of Positive Electrode

The dielectric particles, acetylene black (AB) as a conductive aid, polyvinylidene fluoride (PVDF) as a binder, and N-methyl-2-pyrrolidone (NMP) as a dispersion medium were subjected to premixing and then wet mixing using a planetary centrifugal mixer to give a premix slurry. Subsequently, $LiNi_{0.6}Co_{0.2}Mn_{0.2}O_2$ (NCM622) as a positive electrode active material was mixed with the resulting premix slurry. The mixture was subjected to a dispersion process using a planetary mixer to give a positive electrode material mixture paste. Table 3 shows the mass content of each component in the positive electrode material mixture paste. NCM622 had a median diameter of 12 μm.

The positive electrode material mixture paste was applied to an aluminum foil as a positive electrode current collector and then dried. Subsequently, the dried material on the positive electrode current collector was pressed using a roll press and then dried in vacuo at 120° C. to form a positive electrode material mixture layer, so that a positive electrode plate was obtained. The resulting positive electrode plate was punched into a size of 30 mm×40 mm so that a positive electrode was obtained.

Preparation of Negative Electrode

An aqueous solution of carboxymethyl cellulose (CMC) as a binder and acetylene black (AB) as a conductive aid were premixed using a planetary mixer. Subsequently, natural graphite (NG) as a negative electrode active material was added to the mixture and then premixed using a planetary mixer. Subsequently, water as a dispersion medium and styrene butadiene rubber (SBR) as a binder were added to the mixture, which was subjected to a dispersion process using a planetary mixer to give a negative electrode material mixture paste. The negative electrode material mixture paste had a mass composition ratio of NG, AB, CMC, and SBR of 96.5:1.0:1.0:1.5. NG had a median diameter of 12 μm.

The negative electrode material mixture paste was applied to a copper foil as a negative electrode current collector and then dried. Subsequently, the dried material on the negative electrode current collector was pressed using a roll press, and then dried in vacuo at 130° C. to give a negative electrode material mixture layer, so that a negative electrode plate was obtained. The resulting negative electrode plate was punched into a size of 34 mm×44 mm so that a negative electrode was obtained.

Preparation of Lithium-Ion Secondary Battery

An aluminum laminate (manufactured by Dai Nippon Printing Co., Ltd.) for a secondary battery was heat-sealed to form a bag-shaped case. A separator was placed between the positive and negative electrodes. The resulting laminate was placed in the case, and then an electrolyte solution was injected into the interface between the electrodes. The case was then sealed at a reduced pressure of 95 kPa so that a lithium-ion secondary battery was obtained. The separator was a polyethylene microporous membrane with its one side coated with alumina particles with a thickness of about 5 μm. The electrolytic solution was a solution of 1.2 mol/L LiPF$_6$ as an electrolyte salt in a mixed solvent of ethylene carbonate, ethyl methyl carbonate, and dimethyl carbonate in a volume ratio of 30:30:40.

Evaluation of Initial Performance of Lithium-Ion Secondary Battery

The lithium-ion secondary battery of each of Examples 1 to 8 and Comparative Examples 1 to 3 was evaluated for initial performance as shown below.

Discharge Capacity

The lithium-ion secondary battery was allowed to stand at a measurement temperature (25° C.) for 1 hour, then charged at a constant current of 8.4 mA until 4.2 V was reached, subsequently charged at a constant voltage of 4.2 V for 1 hour. Subsequently, the lithium-ion secondary battery was allowed to stand for 30 minutes, and then discharged at a constant current of 8.4 mA until 2.5 V was reached. The process was repeated 5 times, in which the discharge capacity (mAh) at the fifth discharge was determined. The current value at which the discharge was completed in 1 hour was normalized to 1 C with respect to the resulting discharge capacity.

Cell Resistance

After the measurement of the discharge capacity, the lithium-ion secondary battery was allowed to stand at a measurement temperature (25° C.) for 1 hour, then charged at a constant current and a charge rate of 0.2 C such that the charge level (state of charge (SOC)) was adjusted to 50%, and then allowed to stand for 10 minutes. Subsequently, the lithium-ion secondary battery was pulse-discharged at a discharge rate of 0.5 C for 10 seconds, during which the voltage was measured. The current value was plotted on the horizontal axis, and the 10 second-discharge voltage for the discharge rate of 0.5 C was plotted on the vertical axis. Next, after being allowed to stand for 10 minutes, the lithium-ion secondary battery was supplementarily charged until SOC returned to 50%, and then allowed to stand for 10 minutes. The operation shown above was performed at each of the discharge rates 1.0 C, 1.5 C, 2.0 C, 2.5 C, and 3.0 C, and the 10 second-discharge voltage was plotted for each discharge rate. The cell resistance (mΩ) was then defined as the slope of an approximate straight line obtained from the plots by least squares method.

Evaluation of Performance of Lithium-Ion Secondary Battery after Endurance Test

The lithium-ion secondary battery of each of Examples 1 to 8 and Comparative Examples 1 to 3 was evaluated for performance after an endurance test as shown below.

Discharge Capacity

In a thermostatic chamber at 45° C., the lithium-ion secondary battery was subjected to 500 cycles of constant-current charging to 4.2 V at a charge rate of 1 C and then constant-current discharging to 2.5 V at a discharge rate of 2 C. The lithium-ion secondary battery was then allowed to stand for 24 hours in the thermostatic chamber with the temperature changed to 25° C. The lithium-ion secondary battery was then charged at a constant current and a charge rate of 0.2 C until 4.2 V was reached, and subsequently charged at a constant voltage of 4.2 V for 1 hour. Subsequently, the lithium-ion secondary battery was allowed to stand for 30 minutes, then discharged at a discharge rate of 0.2 C until 2.5 V was reached, and then measured for discharge capacity (mAh).

Cell Resistance

After the measurement of the discharge capacity, the lithium-ion secondary battery was charged such that the charge level (state of charge (SOC)) was adjusted to 50%, and then the cell resistance (mΩ) was determined as in the measurement of the initial performance.

Capacity Retention

The capacity retention (%) was defined as the percentage ratio of the discharge capacity after the endurance test to the initial discharge capacity.

Rate of Change in Resistance

The rate (%) of change in resistance was defined as the percentage ratio of the cell resistance after the endurance test to the initial cell resistance.

Table 3 shows the results of evaluation of the initial performance of the lithium-ion secondary battery and the results of evaluation of the performance of the lithium-ion secondary battery after the endurance test.

TABLE 3

|  |  | Example | | | | | | | | Comparative Example | | |
| --- | --- | --- | --- | --- | --- | --- | --- | --- | --- | --- | --- | --- |
|  |  | 1 | 2 | 3 | 4 | 5 | 6 | 7 | 8 | 1 | 2 | 3 |
| Positive electrode material mixture layer | NCM622 | 93 | 93 | 93 | 93 | 93 | 89 | 89 | 93 | 94 | 93 | 93 |
|  | AB | 4.2 | 4.2 | 4.2 | 4.2 | 4.2 | 4.2 | 4.2 | 4.2 | 4.2 | 4.2 | 4.2 |
|  | PVDF | 1.8 | 1.8 | 1.8 | 1.8 | 1.8 | 1.8 | 1.8 | 1.8 | 1.8 | 1.8 | 1.8 |
|  | Dielectric particles | 1 | 1 | 1 | 1 | 1 | 5 | 5 | 1 | 0 | 1 | 1 |
| Ionically-conductive particles | Abbreviation | LATP | LNO | LATP | LNO | LNO | LATP | LLT | LPO | — | LATP | — |
|  | Relative permittivity/— | 30.6 | 40.7 | 50.1 | 40.7 | 40.7 | 50.1 | 37.8 | 30.0 | — | 50.1 | — |
|  | $D_{50}$/μm | 0.4 | 0.5 | 1.0 | 0.5 | 0.5 | 1.0 | 1.0 | 1.0 | — | 1.0 | — |
|  | Content (% by mass) | 0.5 | 0.5 | 0.5 | 0.5 | 0.5 | 4.9 | 4 | 0.5 | — | 1 | — |
| Non-ionically-conductive particles | Abbreviation | BZTO | BZTO | BZTO | BTO | BTO | BZTO | BZTO | BZTO | — | — | BTO |
|  | Relative permittivity/— | 89.3 | 89.3 | 89.3 | 107.8 | 35.0 | 89.3 | 89.3 | 89.3 | — | — | 107.8 |
|  | $D_{50}$/μm | 0.15 | 0.15 | 0.15 | 0.07 | 0.50 | 0.15 | 0.15 | 0.15 | — | — | 0.07 |
|  | Content (% by mass) | 0.5 | 0.5 | 0.5 | 0.5 | 0.5 | 0.1 | 1 | 0.5 | — | — | 1 |
| Initial performance | Discharge capacity/mAh | 42.5 | 42.3 | 42.5 | 42.5 | 42.5 | 42.0 | 42.0 | 42.5 | 42.5 | 42.3 | 42.5 |
|  | Cell resistance/mΩ | 1000 | 1050 | 1030 | 1038 | 1020 | 1050 | 1040 | 1055 | 1000 | 1020 | 1200 |
| Performance after endurance test | Discharge capacity/mAh | 38.3 | 37.6 | 38.3 | 38.3 | 37.8 | 37.4 | 37.4 | 37.8 | 37.4 | 37.6 | 37.8 |
|  | Cell resistance/mΩ | 1250 | 1313 | 1236 | 1308 | 1275 | 1313 | 1248 | 1319 | 1485 | 1377 | 1500 |
|  | Capacity retention/% | 90 | 89 | 90 | 90 | 89 | 89 | 89 | 89 | 88 | 89 | 89 |
|  | Rate of change in resistance/% | 125 | 125 | 120 | 126 | 125 | 125 | 120 | 125 | 149 | 135 | 125 |

Table 3 shows that the lithium-ion secondary batteries of Examples 1 to 8 have relatively low cell resistances initially and after the endurance test.

The lithium-ion secondary battery of Comparative Example 1 with the positive electrode material mixture layer containing no dielectric particles has a relatively high cell resistance after the endurance test. The lithium-ion secondary battery of Comparative Example 2 with the positive electrode material mixture layer containing no non-ionically-conductive particles also has a relatively high cell resistance after the endurance test. Moreover, the lithium-ion secondary battery of Comparative Example 3 containing no conically-conductive particles has a relatively high initial cell resistance.

What is claimed is:

1. A positive electrode comprising: a positive electrode current collector; and a positive electrode material mixture layer,
    the positive electrode material mixture layer comprising a positive electrode active material and dielectric particles,
    a content of the dielectric particles being 1% by mass or more and 5% by mass or less,
    the dielectric particles including ionically-conductive particles and non-ionically-conductive particles, a content of the non-ionically-conductive particles being 2% by mass or more and 50% by mass or less, a content of the ionically-conductive particles being 50% by mass or more and 98% by mass or less,
    the ionically-conductive particles being $Li_{0.33}La_{0.55}TiO_3$ particles, $LiNbO_3$ particles, or $Li_3PO_4$ particles, having a relative permittivity of 30 or more, and
    the non-ionically-conductive particles being $BaTi_{1-x}Zr_xO_3$ ($0 \leq X \leq 0.5$), having a relative permittivity of 30 or more.

2. The positive electrode according to claim 1, wherein the non-ionically-conductive particles have a median diameter of 0.07 μm or more and 0.5 μm or less.

3. The positive electrode according to claim 1, wherein the ionically-conductive particles have a median diameter of 0.4 μm or more and 1.0 μm or less.

4. An electricity storage device comprising: the positive electrode according to claim 1; a negative electrode; and an electrolytic solution.

* * * * *